United States Patent
Slusar et al.

(10) Patent No.: US 6,543,978 B2
(45) Date of Patent: Apr. 8, 2003

(54) RESTRAINT METHOD AND APPARATUS FOR THREADED FASTENERS

(75) Inventors: Randall J. Slusar, Greenfield, WI (US); Jeffrey R. Annis, Waukesha, WI (US); Linda R. Borowski, New Berlin, WI (US); Gerald J. Chin, Brookfield, WI (US); Steven C. Chybowski, New Berlin, WI (US); Joseph Koziczkowski, Greendale, WI (US); Roy A. Rice, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/819,313

(22) Filed: Mar. 28, 2001

(65) Prior Publication Data

US 2002/0141845 A1 Oct. 3, 2002

(51) Int. Cl.[7] ................................................. F16B 39/10
(52) U.S. Cl. ........................... 411/119; 411/82; 411/930; 411/372.6
(58) Field of Search ............................ 411/82, 930, 119, 411/120, 121, 372.6, 373, 376, 377

(56) References Cited

U.S. PATENT DOCUMENTS

| | | | | |
|---|---|---|---|---|
| 933,595 A | * | 9/1909 | Starzman | |
| 2,141,071 A | * | 12/1938 | Sorensen | |
| 2,190,075 A | * | 2/1940 | Love | |
| 3,226,140 A | * | 12/1965 | Voegeli | |
| 3,470,787 A | * | 10/1969 | Mackie | |
| 5,092,723 A | * | 3/1992 | Compton | |
| 5,407,310 A | * | 4/1995 | Kassouni | |
| 5,749,670 A | * | 5/1998 | Astor | |
| 5,954,466 A | * | 9/1999 | Coffey | |

FOREIGN PATENT DOCUMENTS

JP    3-69808 A  *  8/1989

* cited by examiner

Primary Examiner—Flemming Saether
(74) Attorney, Agent, or Firm—Terri S. Flynn; Alexander M. Gerasimow; William R. Walbrun

(57) ABSTRACT

A method and apparatus for restricting rotation of a threaded fastener, the apparatus including a bracket member having a securing segment and an extending segment that are integrally linked wherein the securing segment forms a recess and the extending segment forms at least one restraining surface wherein a bonding material that solidifies and remains flexible upon curing is provided within the recess and, with the threaded fastener received within an aperture, the bracket member is positionable such that one end of the threaded member is receivable within the recess and within the bonding material prior to curing and the restraining surface contacts a surface of a receiving member to restrict motion of the bracket member about the aperture.

20 Claims, 4 Drawing Sheets

RESTRAINT METHOD AND APPARATUS FOR THREADED FASTENERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to fasteners, and more specifically to a rotation restraining device for use in limiting rotation and loosening of threaded fasteners.

Although threaded fasteners are commonly used in industrial applications, environmental factors associated with such industrial applications can adversely affect the effectiveness of such fasteners. Industrial applications, for example, often include dynamic loading and motive devices that cause vibration and "shock" forces that affect mechanical joints formed by such fasteners. In addition, many industrial applications require motors, generators, and other industrial devices that generate excessive amounts of heat and therefore temperatures and related humidities in industrial environments are difficult to control.

Vibrational and shock forces, cyclical heating levels, and other environmental conditions have been known to cause threaded fasteners to rotate and loosen. While rotation of threaded fasteners has always been problematic, the loose fastener problem has become exacerbated recently as more industrial equipment is constructed from plastic. This is because plastic deforms and relaxes more readily than other rigid materials when subjected to adverse industrial application environments.

Complicating matters, threaded fasteners are often difficult to access inside equipment. Factory and industrial installations, for example, are often short on space, and industrial equipment, therefore, is designed to minimize size rather than to provide adequate access to fasteners. Furthermore, to save floor space, equipment is often installed in locations that are difficult to access.

For these reasons it would be advantageous to have a fastener assembly that would essentially lock threaded fasteners in their fastening positions.

BRIEF SUMMARY OF THE INVENTION

It has been recognized that a simple restraining device can be provided to lock threaded fasteners in their fastening positions by providing an elongated member that forms a recess at one end and a restraining surface at another where the recess is sized so as to receive one end of a fastener and the restraining surface is formed so as to abut a surface of a receiving member (i.e., the member that receives the fastener) such that the elongated member cannot rotate in the direction corresponding to the loosening direction for the fastener. A fluid adhesive is provided within the recess and around the fastener end and forms a solid that fills the space between the recess surface and the received end.

An exemplary embodiment of the invention includes an apparatus for use with a fastener and a receiving member, the fastener including a first end and a threaded extension that extends from the first end, the receiving member forming an aperture along an axis for threadably receiving the extension and also forming at least a first surface that is essentially parallel to the axis and that is at least in part non-concentric with the aperture. The threaded member is removable from the aperture via rotation in a first direction. The apparatus comprises a bracket member including at least a securing segment and an extending segment that are integrally linked, the securing segment forming a recess, the extending segment extending laterally from the securing segment and forming a restraining surface. The apparatus also includes a bonding material that becomes solid and flexible upon curing, the bonding material provided within the recess.

With the threaded member received within the aperture and un-cured bonding material within the recess, the bracket member is positionable such that the first end is receivable within the recess and the restraining surface contacts the first surface, the surfaces together restrain rotation of the bracket member in the first direction about the axis.

Thus, one object is to provide an apparatus for limiting or restricting rotation of a threaded fastener. A related object is to prevent fasteners from becoming loose.

Another object is to provide a fastener restraining device that can easily and relatively quickly be installed. To this end the recess can be relatively larger than the received fastener end as the cured adhesive fills in the remaining gap. Thus, the device can be installed without having to precisely align a fastener end with the receiving recess.

One other object is to provide a device that can be installed without requiring tools. As indicated above no additional tools ar eurd to install the present device.

Moreover, yet another object is to provide a restraining system that can be used with many different fastener types. To this end the recess can be oversized so that various fastener head sizes (i.e., small and large) and shapes (i.e., square, hexagonal, octagonal, standard of Philips screw, etc.) can be accommodated. Again, the adhesive fills in the space between the head and the recess surface to form a secure bond.

In one embodiment an inwardly extending lip is provided along the recess opening. The lip serves to ensure that the solid adhesive stays within the recess during curing. In addition, if the bond between the adhesive and the fastener head and the recess surface fails, the lip traps the solid adhesive within the recess.

In one aspect a boss extension may be provided within the recess to maintain a space between the portion of the recess surface adjacent the boss and the fastener. Thus, another object is to provide a locking device of the above kind where adhesive contacts a large surface area of each of the recess and fastener surfaces thus forming a superior bond.

In one aspect the recess is defined by a recess surface that includes at least one radial incongruity wherein the phrase "radial incongruity" means that, given alignment of the recess with a fastener aperture, from the perspective of the aperture at least one portion of the surface is different than other portions. For example, in some embodiments the recess may form a main cavity and one or more lateral cavities that open into the main cavity. As another example the recess may define an extension into an otherwise cylindrical recess. The in-congruous surface or segment or member operates, in conjunction with the solid adhesive, to mechanically restrain the fastener. Also, in this regard, the apparatus is especially useful in conjunction with fasteners where the fastener portion received within the recess includes a radial incongruity.

In one embodiment the extending segment includes first, second and third extending segments, each of the extending segments being an essentially elongated flat member, the first extending segment linked to the secure segment at one end, the second extending segment extending from an end of the first extending segment opposite the securing segment, essentially perpendicular to the first extending segment and to the side of the first extending segment on which the recess opens, the third extending segment extending from an end of the second extending segment opposite the first extending segment and essentially parallel to the first extending segment, the third extending segment forming the restraining surface.

The invention also includes an apparatus for use with first and second. fasteners and a receiving member, each fastener including a first end and a threaded extension that extends from the first end, the first ends forming first and second essentially oppositely facing surfaces that define a first dimension. In this embodiment the apparatus is for restraining rotation of the fasteners when the extensions are received within apertures.

Here the apparatus comprises a bracket member including first, second and third integrally linked extending members, each of the first and third members including proximal and distal ends and forming first and second facing recesses at the distal ends, respectively, the second member linked at opposite ends to the first and third member proximal ends, respectively, the second distal ends defining a second dimension and preferably, where boss extensions are included, the boss extensions form the second dimension.

The apparatus also includes a bonding material that becomes solid and flexible upon curing, the bonding material provided within the recesses. With the threaded members received within the apertures and un-cured bonding material within the recesses the bracket member is positionable such that the first ends of the first and second fasteners are receivable within the recesses. Preferably the second dimension is less than the first dimension.

The invention also includes a method for use with a fastener and a receiving member, the fastener including a first end and a threaded extension that extends from the first end, the receiving member forming an aperture along an axis for threadably receiving the extension and also forming at least a first surface that is essentially parallel to the axis and that is at least in part non-concentric with the aperture, the threaded member removable from the aperture via rotation in a first direction. The method is for restraining rotation of the fastener when the extension is received within the aperture. The method comprises the steps of providing a bracket member including at least a securing segment and an extending segment that are integrally linked, the securing segment forming a recess, the extending segment extending laterally from the securing segment and forming a restraining surface; placing a fluid bonding material that becomes solid and flexible upon curing within the recess; with the threaded member received within the aperture, positioning the bracket such that the first end is receivable within the recess and the restraining surface contacts the first surface, the surfaces together restrain rotation of the bracket member in the first direction about the axis; and allowing the bonding material to cure.

Furthermore the invention includes a method for use with first and second fasteners and a receiving member, each fastener including a first end and a threaded extension that extends from the first end, the receiving member forming first and second essentially oppositely facing surfaces and the first ends defining a first dimension. The receiving member also forming first and second apertures along first and second essentially parallel axis for threadably receiving the first and second fastener extensions, respectively. The method is for restraining rotation of the fasteners when the extensions are received within the apertures. The method comprises the steps of: providing a bracket member including first, second and third integrally linked extending members, each of the first and third members including proximal and distal ends and forming first and second facing recesses at the distal ends, respectively, the second member linked at opposite ends to the first and third member proximal ends, respectively, the second distal ends defining a second dimension when the bracket is in an unstressed state; placing a fluid bonding material that becomes solid and flexible upon curing within the recesses; with the threaded members received within the apertures, positioning the bracket such that the first ends of the first and second fasteners are receivable within the recesses; and allowing the bonding material to cure.

Thus, one other object is to provide a bracket device that can lock more than one threaded fastener in place.

These and other objects, advantages and aspects of the invention will become apparent from the following description. In the description, reference is made to the accompanying drawings which form a part thereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

Figures 1, 2:
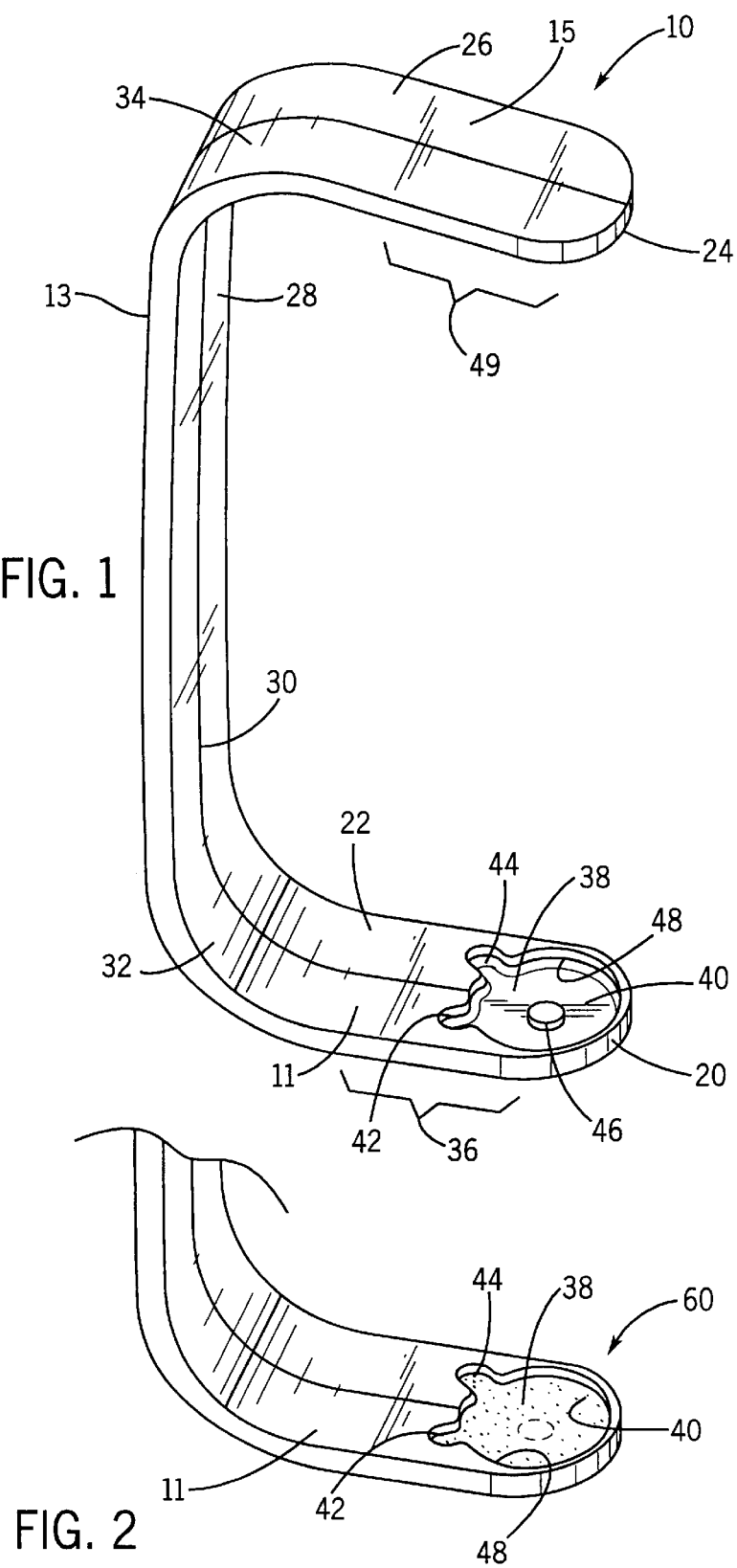
FIG. 1 is a perspective view of a restricting device according to the present invention.
FIG. 2 is partial view of a portion of the device of FIG. 1 with an adhesive provided in a recess.

Referring now to the Figures and more particularly to FIG. 1, an inventive restraining device 10 comprises a bracket including first, second and third essentially flat and elongated segments 11, 13 and 15 that are linked together to form an essentially "C" shaped device. To this end first segment 11 includes distal and proximal ends 20 and 22, respectively, third segment 15 includes distal and proximal ends 24 and 26, respectively, second segment 13 includes opposite ends 28 and 30, first segment proximal end 22 is integrally linked to end 30 and proximal end 26 is linked to end 28 and segments 11 and 15 extend to the same side of second segment 13.

Figure 3:
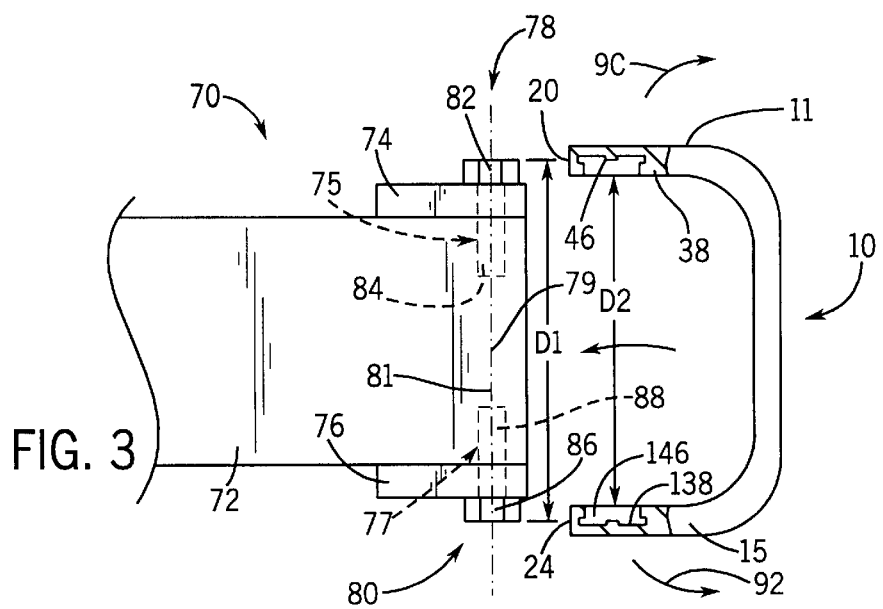
FIG. 3 is a side elevational view of the device of FIG. 1 adjacent a receiving member and two fastening members.
Figure 5:
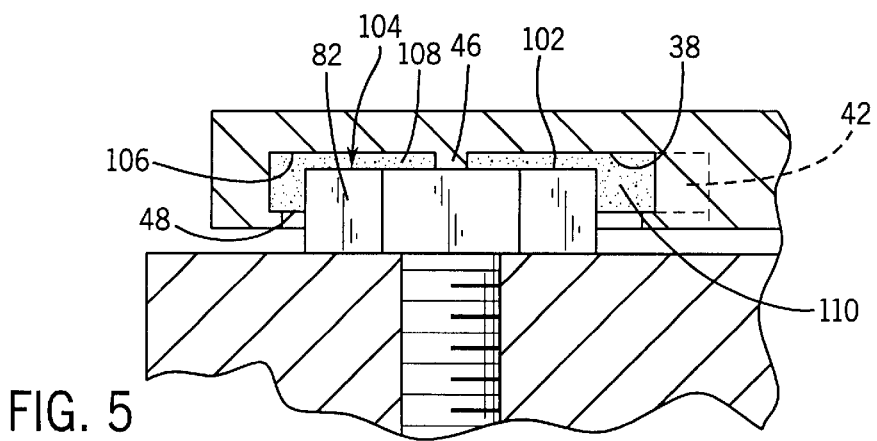
FIG. 5 is a partial cross sectional view of the configuration of FIG. 4.

Although not necessary, the illustrated embodiment first and third segments 11 and 15 are linked to second segment 13 via curved segments 32 and 34, respectively, to provide a relatively more finished appearance. At the end of first segment 11 a securing segment 36 is provided. Importantly, securing segment 36 forms an essentially cylindrical recess 38 facing third segment 15. Recess 38 includes a main recess 40 and two laterally extending recesses 42 and 44 that open into main recess 40. Inside main recess 40 an extension boss 46 extends toward third segment 15 and has a relatively short length such that the end of boss 46 is well within recess 38. Referring to FIGS. 1 and 5, securing segment 36 forms a lip, 48 around the entire opening of recess 38 that extends inwardly. The distal end 24 of third segment 15 also forms a securing segment 49. Referring also to FIG. 3, segment 48, like segment 36, forms a recess 138 including a main recess and two laterally extending recesses (not illustrated in FIG. 3), a boss and a lip. Although the construction of recess 138 is not illustrated in detail it should be recognized that in the present example recess 138 would include elements likes main recess 40, lateral recesses 42 and 44, boss 46 and lip 48, as illustrated in FIG. 1. Recess 138 faces first segment 11.

Device 10 is preferably constructed of a moldable, non-conductive, low modulus material so that the material prevents adverse interactions with internal electrical circuits while allowing segments 11, 13 and 15 to be bent and flexed for easy installation, preferably, to provide a clamping force when installed.

Referring now to FIGS. 1 and 2, in addition to device 10, the present invention employs a bonding material, preferably a polyurethane adhesive, that is initially in a liquid or fluid form and that cures to form a solid flexible bonding "insert" or member. The adhesive forms a bond between the internal surface of recess 38 and the head or an end of a threaded fastener as will be described in more detail below. In FIG. 2, recess 38, including main recess 40 and lateral recess 42 and 44 are shown filled with a the non-cured liquid adhesive.

Referring now to FIG. 3, a receiving member 70 including a base member 72 and two connecting members 74 and 76 is illustrated. In addition, two threaded fasteners 78 and 80 in the form of two screws are also illustrated. Fastener 78 includes a hexagonal head member 82 and an extending member 84 while screw 80 includes head member 86 and a threaded extending member 88. Screws 82 and 86 are provided to secure members 74 and 76 to member 72. When members 74 and 76 are positioned as illustrated, members 72, 74 and 76 together form receiving member 70 which defines two apertures 75 and 77 that extend along essentially parallel aperture axis 79 and 81 respectively. Extending members 84 and 88 are threadably received within apertures 75 and 77 such that the oppositely facing surfaces of heads 82 and 86 define a first dimensions D1.

As best seen in FIG. 3, the distance between facing boss extensions 46 (see also FIG. 1) and 146 within opposing recesses 38 and 138 define a second dimension D2. Second dimension D2 is slightly less than first dimension D1 so that, when device 10 is used to clamp-screws 78 and 80 in place axial pressure is applies to heads 82 and 86 as described below.

Referring now to FIGS. 1, 2 and 3, in order to use device 10 to restrict rotation of screws 78 and 80, an adhesive 60 is provided within each recess 38 and 138. Next, as best illustrated in FIG. 3, first and second segments 11 and 15 are pulled or flexed apart in the direction of arrows 90 and 92 thereby causing the dimension D2 between boss extensions 46 and 146 to exceed the dimension D1 between oppositely facing surfaces of heads 82 and 86.

Figure 4:
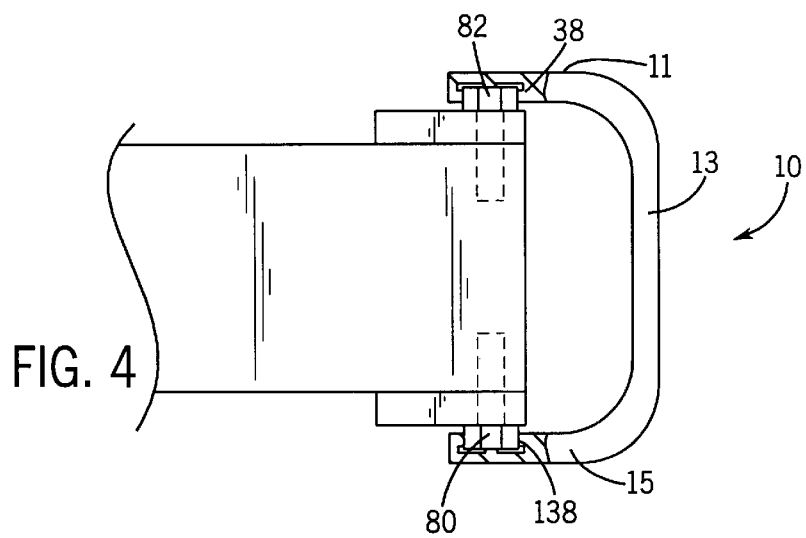
FIG. 4 is similar to FIG. 3 albeit illustrating the device secured to the fasteners and receiving member of FIG. 3.

Referring still to FIG. 3 and also to FIG. 4, device 10 is positioned such that screw heads 80 and 82 are adjacent recesses 38 and 138 and then device 10 is de-stressed thereby allowing the device to spring back toward its natural state. Because dimension D1 is less than dimension D2, device 10 places a clamping force on heads 82 and 86.

Referring now to FIGS. 4 and 5, with device 10 so positioned, boss 46 contacts an upper surface 102 of head 82 thereby causing a gap 104 to exist between a recess wall 106 and surface 102. Thus, a layer of adhesive 108 fills gap 106. In addition, adhesive fills the gap between lateral surfaces of head 82 and the other recess surfaces as illustrated. Referring also to FIG. 2, the adhesive extends into lateral recesses 42 and 44 and fills up to lip 48.

After device 10 has been positioned as described above, the adhesive is allowed to cure so that the adhesive becomes a solid flexible member 110 inside recess 38. A similar flexible member (not illustrated) is formed within recess 138.

Figure 6:
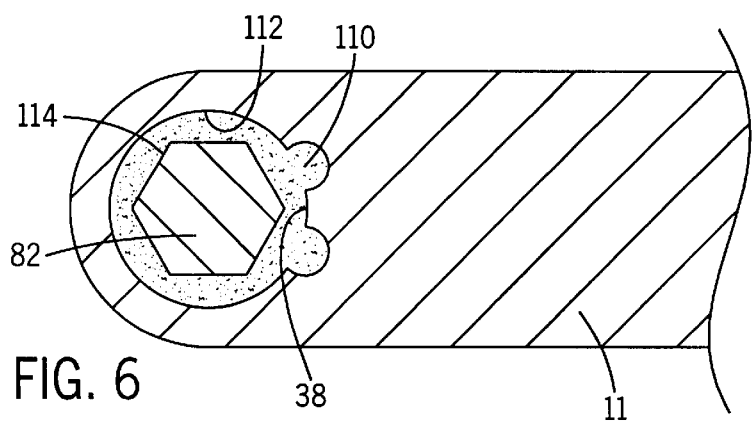
FIG. 6 is a cross sectional view taken along the line 6—6 of FIG. 5.

After the adhesive cures, the adhesive restricts fastener rotation in two ways. First, because the adhesive preferably adheres to each of head 82 and the internal surface of recess 38, the adhesive bonding should restrict rotation. Second, even if one or both of the adhesive bonds between member 110 and head 82 or member 110 and the internal surface of recess 38 is not formed or deteriorates over time, member 110 is solid and flexible and should act as a mechanical jamb between head 82 and lateral recess walls. To this end, see FIG. 6 which shows cured member 110 that completely fills the space between recess wall 112 and head wall 114.

While a single embodiment is illustrated and described above clearly many other embodiments are contemplated by the present invention. For example, referring now to FIG. 7, a device 210 bis illustrated for restricting rotation of a single threaded fastener In this case, referring also to FIG. 1, device 210 is essentially identical to first segment 11 including a rigid member which forms a recess 238 akin to recess 38 and lateral recesses 242 and 244 akin to lateral recesses 42 and 44. In addition, although not illustrated, device 210 may also include a boss 46. Device 210 extends laterally from recess 238 and includes at least one restricting surface 250. In this case receiving member 252 includes at least a first surface that is essentially parallel to an aperture access 256 and that is at least in part non-concentric with the aperture that receives fastener 260 shown in phantom. In this case non-concentric means a surface that includes portions that are different distances from the axis 256. Thus, for example, a cylindrical surface or a dome shaped surface centered on axis 256 would not be non-cylindrical whereas a planar surface extending parallel to aperture 256 as illustrated would be non-concentric.

Figure 7:
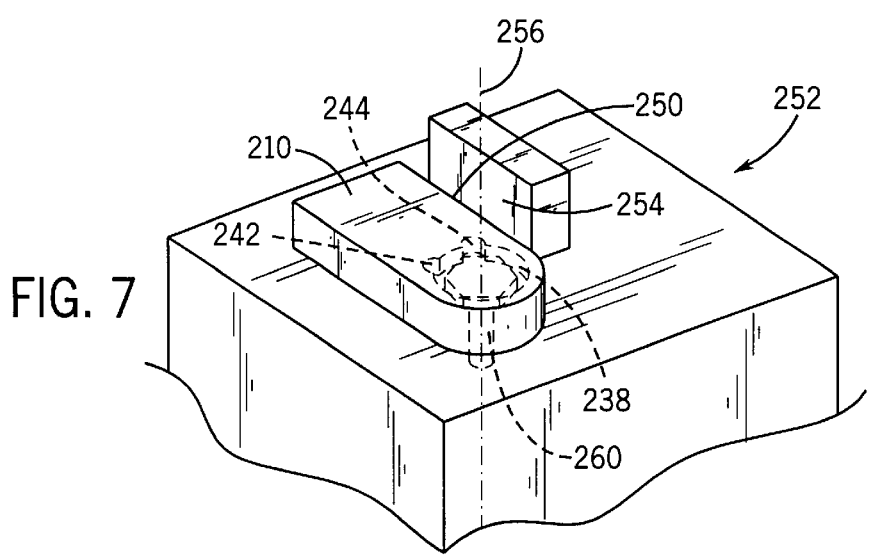
FIG. 7 is a perspective view of another embodiment of the inventive device.

Referring still to FIG. 7, to restrict rotation of fastener 260, adhesive is provided within recess 238 and a head portion of fastener 260 is received within the recess 238 with restricting surface 250 placed against first surface 254 where a loosening direction of fastener rotation is in the clockwise direction. In this case, after the adhesive cures and forms a solid and flexible member within recess 238, fastener rotation is essentially eliminated.

Figure 8:
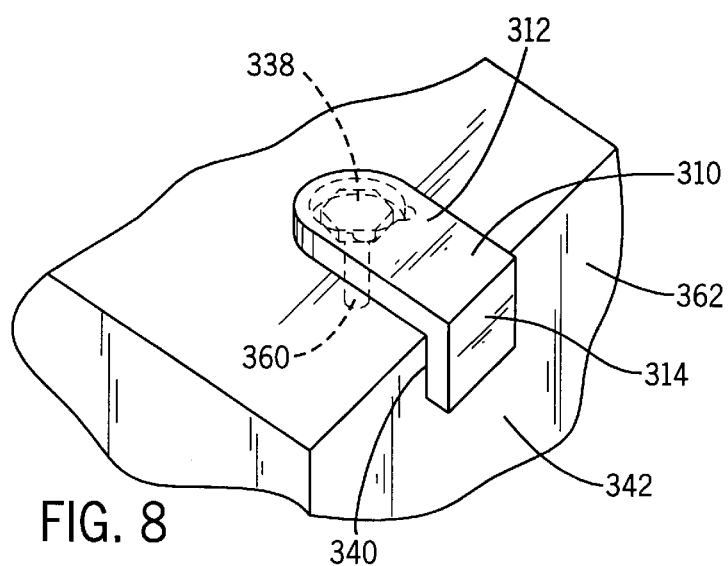
FIG. 8 is a perspective view of one other embodiment of the invention.

Referring now to FIG. 8, a third embodiment of the present invention is illustrated. Referring also to FIG. 1, the device 310 in FIG. 8 is similar to a device including only first and second segments 11 and 13 wherein a first segment 312 is akin to segment 11 and a second segment 314 is akin to segment 13. In addition, a recess 338 formed by segment 312 is essentially identical to the recesses described above and the fastener secured by the device 310 is essentially identical to the fastener described above. In the embodiment of FIG. 8, second segment 314 extends at a right angle to first segment 312 and, when secured and adhered to the head of fastener 360, second segment 314 bends around a corner of a receiving member 362 and includes a restricting surface 340 that contacts a first surface 342 of member 362. When an adhesive within recess 338 cures, surfaces 340 and 342 restrict rotation of fastener 360. In this embodiment surface 342 is non-concentric with an aperture recess (not illustrated).

It should be appreciated that the methods and apparatuses described above are only exemplary and do not limit the scope of the invention, and that various modifications could be made by those skilled in the art that would fall under the scope of the invention. For example, while three different shapes of restricting devices are illustrated above, clearly the shape of the restricting device can be modified depending upon the relative position of a threaded fastener with respect to the device, the relative positions of walls or other stationary objects to which the device is coupled and other considerations. Thus, the length of any of segments 11, 13 or 15 in FIG. 1 could be modified.

Figure 9:
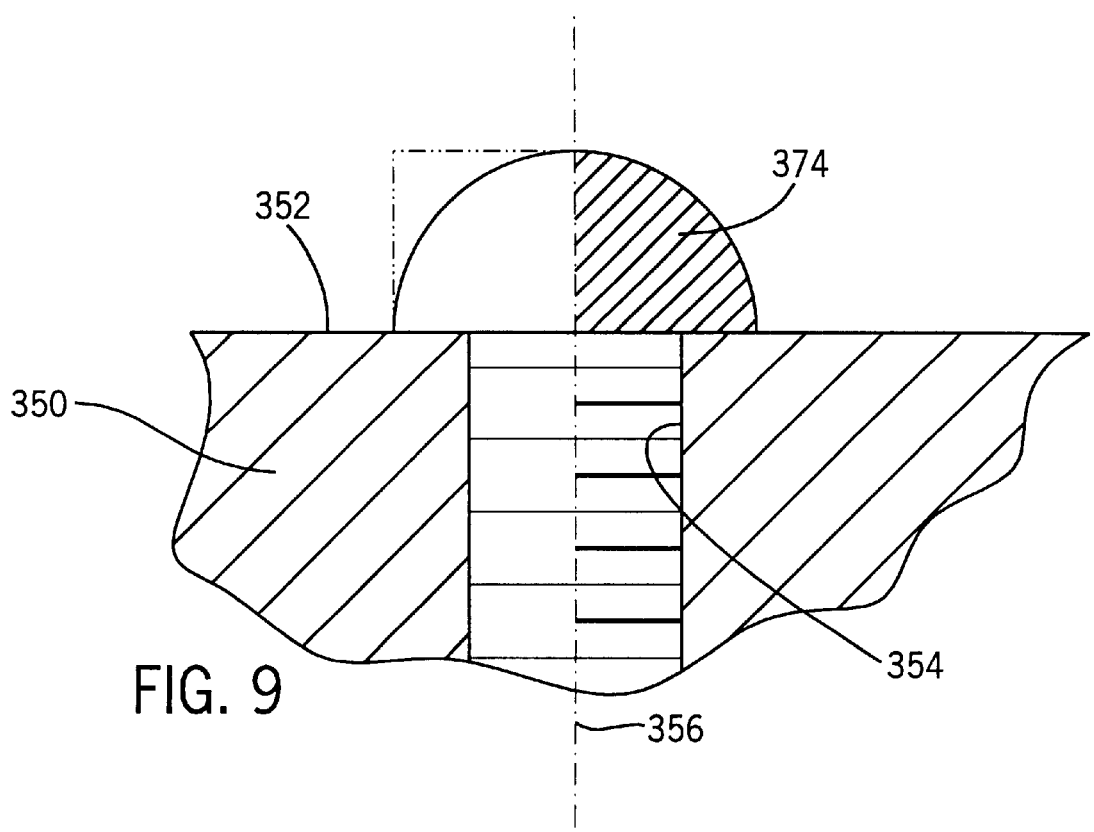
FIG. 9 is a schematic illustrating radial congruity and incongruity.

In addition, while one recess 38 configuration is illustrated and one fastener first end in the form of a hexagon shape is illustrated above, clearly the invention contemplates virtually all other recess and first end shapes. Moreover, to provide a mechanical restraint as well as the adhesive restraint, preferably each of the first end and recess configurations should include radial incongruities. To this end referring now to FIG. 9 a radial incongruity is best understood by a definition of what a radial incongruity is not. In FIG. 9 a receiving member 350 includes a surface 352 within a plane (also 352) and defines a threaded aperture 354 about an aperture axis 356.

Referring still to FIG. 9, a curve 372 is illustrated which is dissected by axis 356 so that axis 356 and the right side of curve 372 define a shape 374. If shape 374 is rotated about axis 356 to define a three dimensional surface the resulting surface will be radially congruent. However, if the shape defined by any portion of a surface 372 and axis 356 is different than any other shape defined by a different portion of a surface 372 and axis 356, the resulting three dimensional surface is radially in-congruent. For example, in FIG. 9 the phantom line shows an in-congruity.

To apprise the public of the scope of this invention, the following claims are made:

What is claimed is:

1. An apparatus for use with a fastener and a receiving member, the fastener including a first end and a threaded extension that extends from the first end, the receiving member forming an aperture along an axis for threadably receiving the extension and also forming at least a first surface that is essentially parallel to the axis and that is at least in part non-concentric with the aperture, the threaded member removable from the aperture via rotation in a first direction, the apparatus for restraining rotation of the fastener when the extension is received within the aperture and comprising:

a bracket member including at least a securing segment and an extending segment that are integrally linked, the securing segment forming a recess enclosed at one end, the extending segment extending laterally from the securing segment and forming a restraining surface;

an uncured bonding material that becomes solid and flexible upon curing, the bonding material provided within the recess;

wherein, with the threaded member received within the aperture and uncured bonding material within the recess, the bracket member is positionable such that the first end is receivable within the recess, the enclosed end of the recess covering the first end of the threaded fastener, and the restraining surface contacting the first surface, the restraining surface and the first surface together restraining rotation of the bracket member in the first direction about the axis.

2. The apparatus of claim 1 wherein the bonding material is an adhesive.

3. The apparatus of claim 2 wherein the adhesive comprises a polyurethane.

4. The apparatus of claim 1 wherein the recess forms a boss extension wherein the first end is received within the recess, the boss extension contacts the first end and forms a gap between the first end and recess portions adjacent the boss extensions.

5. The apparatus of claim 1, wherein the recess forms a boss and wherein the height of the boss is selected to optimize the thickness of the bonding material.

6. The apparatus of claim 1 further including an inwardly extending lip along the recess opening.

7. The apparatus of claim 1 wherein the recess includes at least one radial incongruity.

8. The apparatus of claim 7 wherein the recess includes at least a main cavity and a lateral cavity that opens laterally from the main cavity and wherein the lateral cavity forms the in-congruity.

9. The apparatus of claim 8 wherein the recess includes at least two lateral cavities that open laterally from the main cavity.

10. The apparatus of claim 1 wherein the bracket member comprises a non-conductive low modulus material.

11. The apparatus of claim 1, wherein the surface of the recess is textured.

12. The apparatus of claim 1 wherein the extending segment includes first, second and third extending segments, each of the extending segments being an essentially elongated flat member, the first extending segment linked to the secure segment at one end, the second extending segment extending from an end of the first extending segment opposite the securing segment, essentially perpendicular to the first extending segment and to the side of the first extending segment on which the recess opens, the third extending segment extending from an end of the second extending segment opposite the first extending segment and essentially parallel to the first extending segment, the third extending segment forming the restraining surface.

13. An apparatus for use with first and second fasteners and a receiving member, each fastener including a first end and a threaded extension that extends from the first end, the receiving member forming first and second essentially oppositely facing surfaces and first and second, apertures in the first and second surfaces, respectively, defining a first dimension the apparatus for restraining rotation of the fasteners when the extensions are received within the apertures and comprising:

a bracket member including first, second and third integrally linked extending members, each of the first and third members including proximal and distal ends and forming first and second facing recesses at the distal ends, respectively, the second member linked at opposite ends to the first and third member proximal ends, respectively, the second distal ends defining a second dimension;

an uncured bonding material that becomes solid and flexible upon curing, the bonding material provided within the recesses;

wherein, with the threaded members received within the apertures and un-cured bonding material within the recesses, the bracket member is positionable such that the first ends of the first and second fasteners are receivable within the recesses.

14. The apparatus of claim 13 wherein the second dimension is less than the first dimension.

15. The apparatus of claim 13 wherein the bonding material is an adhesive.

16. The apparatus of claim 13 further including first and second inwardly extending lips along each of the first and second recess openings, respectively.

17. The apparatus of claim 13 wherein each recess includes at least one radial in-congruity.

18. The apparatus of claim 17 wherein each recess includes at least a main cavity and a lateral cavity that opens laterally from the main cavity and wherein the lateral cavity forms the in-congruity.

19. The apparatus of claim 18 wherein each recess includes at least two lateral cavities that open laterally from the main cavity.

20. The apparatus of claim 11 wherein the bracket member comprises a non-conductive low modulus material.

* * * * *